Feb. 21, 1967  J. S. PARENTI  3,304,923
ENGINE

Filed Sept. 2, 1964

INVENTOR.
Joseph S. Parenti,
BY Parker & Brochman,
ATTORNEYS.

J. S. PARENTI 3,304,923

ENGINE

Filed Sept. 2, 1964

INVENTOR.
Joseph S. Parenti
BY
Parker &c.
ATTORNEYS.

Feb. 21, 1967

J. S. PARENTI 3,304,923

ENGINE

Filed Sept. 2, 1964

INVENTOR.
Joseph S. Parenti
BY Parker & Prochnow,
ATTORNEYS.

United States Patent Office 3,304,923
Patented Feb. 21, 1967

3,304,923
ENGINE
Joseph S. Parenti, Rte. 1, Bemus Point, N.Y. 14712
Filed Sept. 2, 1964, Ser. No. 394,077
17 Claims. (Cl. 123—51)

This invention relates to engines of the type operating on vapor pressure, such as internal combustion engines.

In prior engines having pistons connected by piston rods to a crank shaft, a considerable amount of inefficiency results from the fact that these engines are subjected to approximately the full pressure within their cylinders when aproximately in or near dead center positions, at which time very little heat is converted into energy by expansion of the gases. A large amount of heat which is then not absorbed by the expansion of the gases is dissipated by the gases to the cylinder walls where it is wasted.

The main object of this invention is to provide a piston-driven engine in which the relationship between the pistons in the cylinders and the shaft driven thereby is such that the pistons are never near a dead center position with reference to the driven shafts.

It is also an object to provide an engine in which such power stroke of a piston drives the engine shaft only through a part of a revolution.

Another object is to provide an engine with two fly wheels or rotary members which are rotated by the pistons in opposite directions and in which the direction of rotation of one of the fly wheels is reversed and transmitted to a shaft with which the other fly wheel is connected.

It is also an object of this invention to positively connect the oppositely rotating fly wheels so that all of the pistons of the engine will operate in correct sequence.

A further object is to provide an engine of this type in which the pistons are arranged in pairs in such a manner that the expansion stroke of one piston forces the other piston of the pair back toward its cylinder head through its compressing stroke.

Another object is to provide an engine of this type in which the pistons of each part operate in opposite directions and in which the power exerted by one of the pistons is reversed so that the pistons exert force in the same direction on a driven shaft.

Another object is to provide drive means of improved construction which oscillate to transmit the power stroke of a piston through a fly wheel to a driven shaft.

A further object is to provide an improved clutch by means of which a driving arm is coupled to and then disconnected from a fly wheel.

It is also an object of this invention to provide drive means connected with the pistons for moving a clutch member intermittently through fractions of revolutions for transmission to a driven member or fly wheel.

In the accompanying drawings which illustrate by way of example several embodiments of this invention:

FIGS. 4–9 are perspective views of a group of parts cooperating with each other and shown separated from each other. In these figures:

FIGS. 6 and 7 are perspective views of two drive arms formed to cooperate with fly wheels as shown in FIGS. 5 and 8, the drive arm of FIG. 6 cooperating with the fly wheel shown in FIG. 5, and the clutch arm of FIG. 7 cooperating with the fly wheel shown in FIG. 8, which is a perspective view of the other fly wheel formed to cooperate with the drive arm shown in FIG. 7.

FIG. 9 is a stationary cam cooperating with the fly wheel shown in FIG. 8.

FIG. 11 is a similar sectional view showing the devices illustrated in FIGS. 7–9 in operative relation to each other.

FIG. 12 is a diagrammatic view showing the manner of operation of an engine embodying this invention.

In the construction shown in FIGS. 1–11, I have shown four cylinders 20, 21, 22 and 23. These cylinders contain pistons 24, 25, 26 and 27, and if desired the cylinders may be provided with suitable liners 30. These cylinders are mounted in a housing of any suitable construction, this housing as shown being made in three parts secured together, a part 32 containing the cylinders 20 and 21, a part 33 containing the cylinders 22 and 23 and a housing part 34 constituting a clutch case and containing two fly wheels. Cooling jackets 36 may be provided extending about the cylinders, and any suitable means, not shown, may be provided for circulating cooling fluid through these jackets.

Figure 1:
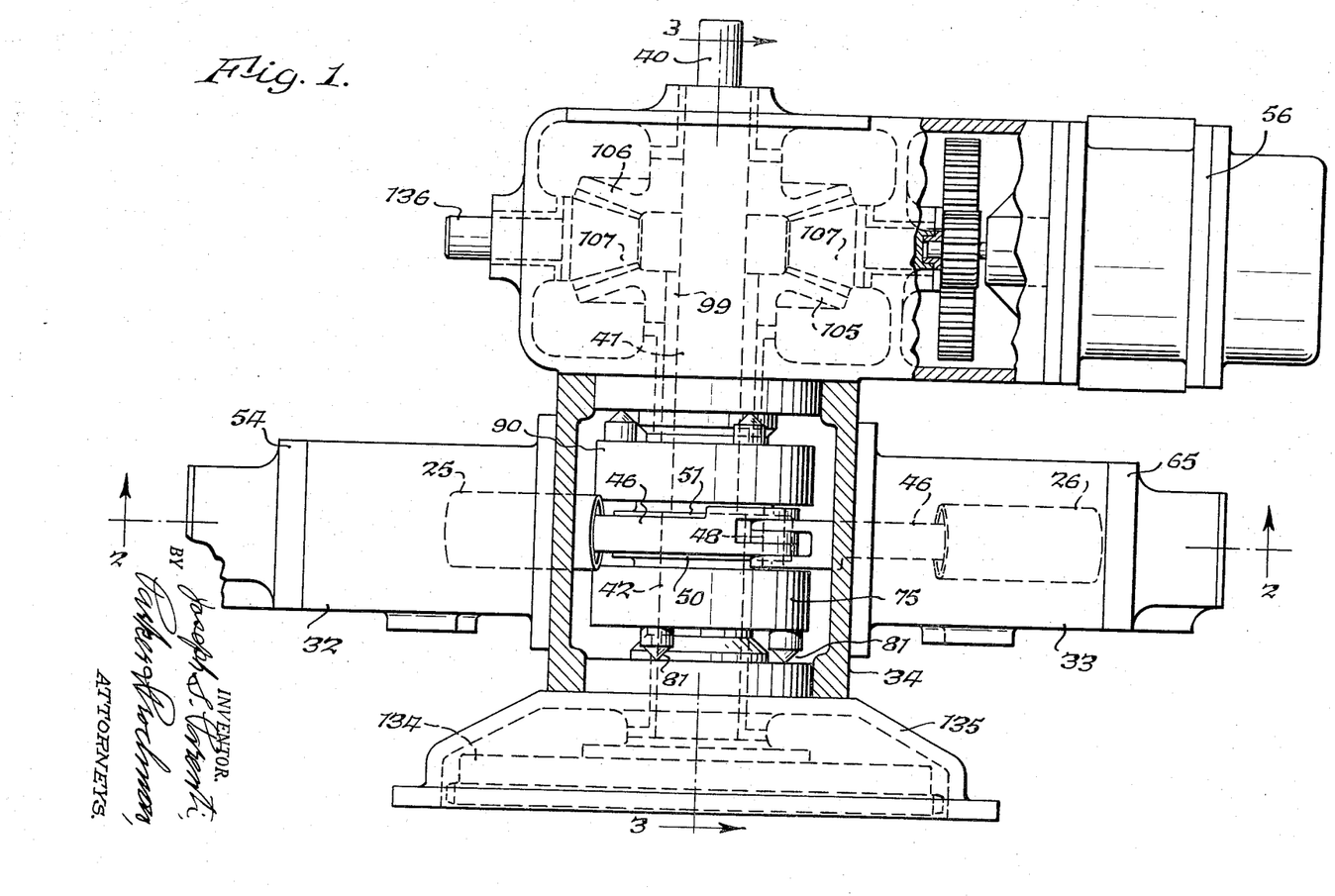
FIG. 1 is an elevation, partly in section, of an engine embodying this invention.
Figure 2:
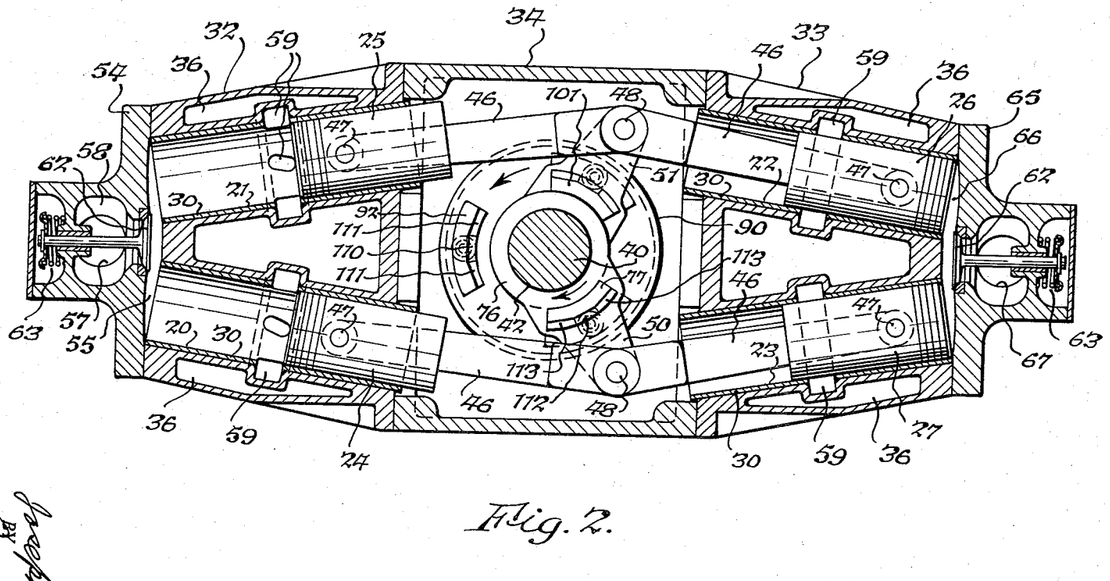
FIG. 2 is a transverse sectional view thereof on line 2—2, FIG. 1.

Power is transmitted from the pistons to a shaft 40, this shaft in the construction shown having integral parts 41 and 42 of larger diameters.

The pistons are provided with piston rods 46 each of which has one end thereof journalled within its piston by means of a pin 47. The outer ends of the piston rods are pivotally connected at 48 to drive arms 50 and 51, and these drive arms are driven from the pistons through a relatively small angle of oscillation with the result that the pistons during their power strokes never operate near a dead center position. During the power stroke of a piston, its drive arm is coupled to a rotary member or fly wheel to impart power thereto and during its return stroke the drive arm is disconnected from the fly wheel but during this return stroke another piston is coupled to the fly wheel through its drive arm so that power is being continuously supplied to the fly wheel.

In the particular construction shown in the drawings, by way of example, each piston rotates its fly wheel during its power stroke through an angle of 60 degrees so that it will be clearly seen in considering FIG. 2 that the piston rods 46 swing through a relatively small angle during the complete strokes of their pistons. It will be understood that it is not intended to limit this invention to the 60 degree strokes as shown.

The head ends of the two cylinders 20 and 21 are closed by a common cylinder head 54, a space 55 being provided within the head with which both of these cylinders communicate. It will be understood that the engine illustrated by way of example is not of the aspirating type but one which requires a small blower or compressor 56, FIG. 1, to furnish air for blowing out the exhaust when the pistons arrive at their exhaust ports 59.

62 represents a valve for admission of air for passage through the two cylinders 20 and 21, the valve being self-opening by air pressure and held closed by the usual spring 63 acting on the valve. 57 represents a passage through which air is admitted to the two cylinders 20 and 21 through a chamber 58 formed in the cylinder head 54. The means for admitting fuel to the cylinders and igniting the explosive gases in the space 55 in the cylinder head is not shown since such devices are well known and do not require illustration, and in case my improved engine is operated on the diesel cycle as in the construction illustrated, ignition systems are not required. When the pistons are approximately at their innerpost positions, the explosion of the fuel takes place.

At the other side of the engine as shown at the right of FIG. 2, a similar cylinder head 65 is provided forming a space 66 in which the heads of the cylinders 22 and 23 terminate, and valve 62 controls the admission of air under pressure from a passage 67 for removing exhaust from the cylinders through the exhaust ports 59.

It will be noted in the operation of the engine that when the two pistons 26 and 27 are in their positions at the heads of the cylinders 22 and 23, as shown in FIG. 2, an explosion of the fuel contained in chamber 66 will drive the two pistons 26 and 27 toward the opposite ends of their strokes and consequently their piston rods 46 will turn the drive arms 50 and 51 through angles of 60 degrees, the two arms turning in opposite directions, as indicated by the arrows in FIG. 2. It will also be noted that the two pistons 26 and 27 through their piston rods 46 and through the piston rods 46 of the pistons 24 and 25 will drive these latter pistons through their compression strokes to the left in FIG. 2 into their positions at the heads of the cylinders 20 and 21. Consequently, when fluid pressure has developed in the combustion chamber 55, fuel will be ignited so that these pistons will be driven to the right in FIG. 2, thus through the piston rods 46 will drive the pistons 26 and 27 back to the positions shown in FIG. 2. It will also be noted that this action of the pistons 24 and 25 will produce oscillatory movement of the drive arms 50 and 51 to which they are connected. A similar action of course will take place in the cylinders 21 and 22 resulting in again swinging the drive arms 50 and 51.

The transmission of power from the drive arms to the power shaft 40 of the engine may be effected in the following manner. The drive arm 50 cooperates with a fly wheel 75 which is keyed to a part 42 of the engine shaft 40 so that any turning or partial rotation of the fly wheel 75 is imparted directly to the engine shaft. The drive arm 50 has a circular band or ring 76 formed integral therewith and extending about the shaft part 42, thus pivoting the drive arm to swing about the shaft. This drive arm 50 also has a lateral extension 77 formed to extend into an annular recess formed in the adjacent face of the fly wheel 75, and this extension 77 is provided on its outer face with an inclined clutch or gripping face formed to cooperate with an inwardly extending, tapering clutch face formed on a clutch block 78. Three of these blocks are provided on the fly wheel. Each clutch block 78 is connected by means of a slidable rod 79 urged to the right in FIG. 11 by means of a spring 80. Each rod has a head 81 formed to ride on an annular stationary cam 83 mounted on the fixed part 84 of the engine housing. This cam has raised cam portions 85 and it will be obvious that as the fly wheel 75 rotates, the projecting part 81 of the slidable bolts 79 will ride on the raised part 85 of the cam and this will result in moving the clutch block 78 to the left in FIG. 11, thus forming a gripping engagement between the drive arm 50 and the clutch block and the fly wheel 75, so that oscillatory action of the drive arm 50 in the one direction will be transmitted through the clutch means to the fly wheel 75 which is keyed to the drive shaft of the engine, thus producing a partial rotation of the engine shaft. As soon as the driving stroke of the piston 27 is completed and the fly wheel continues to rotate the clutch parts disengage, also the drive arm 50 will be moved in the reverse direction by the piston 24, thus disengaging the drive arm 50 from the drive shaft of the engine.

However, when a partial rotation has been transmitted to the drive shaft by means of the piston 27 and the drive arm 50 a similar motion in the reverse direction will be transmitted immediately thereafter by means of the pinions 24 through the piston rod 46 and the drive arm 50.

For this purpose another fly wheel 90 is provided which is substantially identical in construction with the fly wheel 75 but facing in the opposite direction, and the drive arm 50 is provided on the side thereof opposite to the extension 77 with a similar extension 91 having a friction or clutch face which cooperates with a clutch block 92 moved into and out of clutching position by means of a spring biased, slidable rod 93, the outer end of which cooperates with a raised portion 95 of the other stationary cam ring 94, mounted on a fixed part of the frame of the engine.

The friction blocks 92 of the fly wheel 90 are arranged so as to be in positions intermediate of the friction blocks 78 of the fly wheel 75. In other words, if each drive arm advances its fly wheel through an angle of 60 degrees, then the friction members 92 of the fly wheel 90 will be positioned 60 degrees from the corresponding friction members of the fly wheel 75. Consequently the power stroke of the piston 24 will not only move the piston 27 through its compression stroke, but will also actuate the drive arm 50 in a counterclockwise direction in FIG. 2, so as to turn the fly wheel 90 through a 60 degree turn.

The two pistons 25 and 26 operate through the drive arm 51 on two fly wheels 75 and 90 in the same manner as described in connection with the pistons 24 and 27. This drive arm 51 has a circular part 100 by means of which it is rotatably mounted on the part 41 of the engine shaft, and the drive arm also has extensions 101 which cooperate with friction blocks on the fly wheels similar to the blocks 77 and 92 hereinbefore referred to. Since the structure and operation of the parts operated by the drive arm 51 are identical with that described in connection with the pistons 24 and 27, further description is not deemed necessary since it will be understood that the pistons 25 and 26 impart rotation to the fly wheels 75 and 90 by means of the drive arms 51 in the same manner as the pistons which connect with the drive arm 50.

Figure 3:
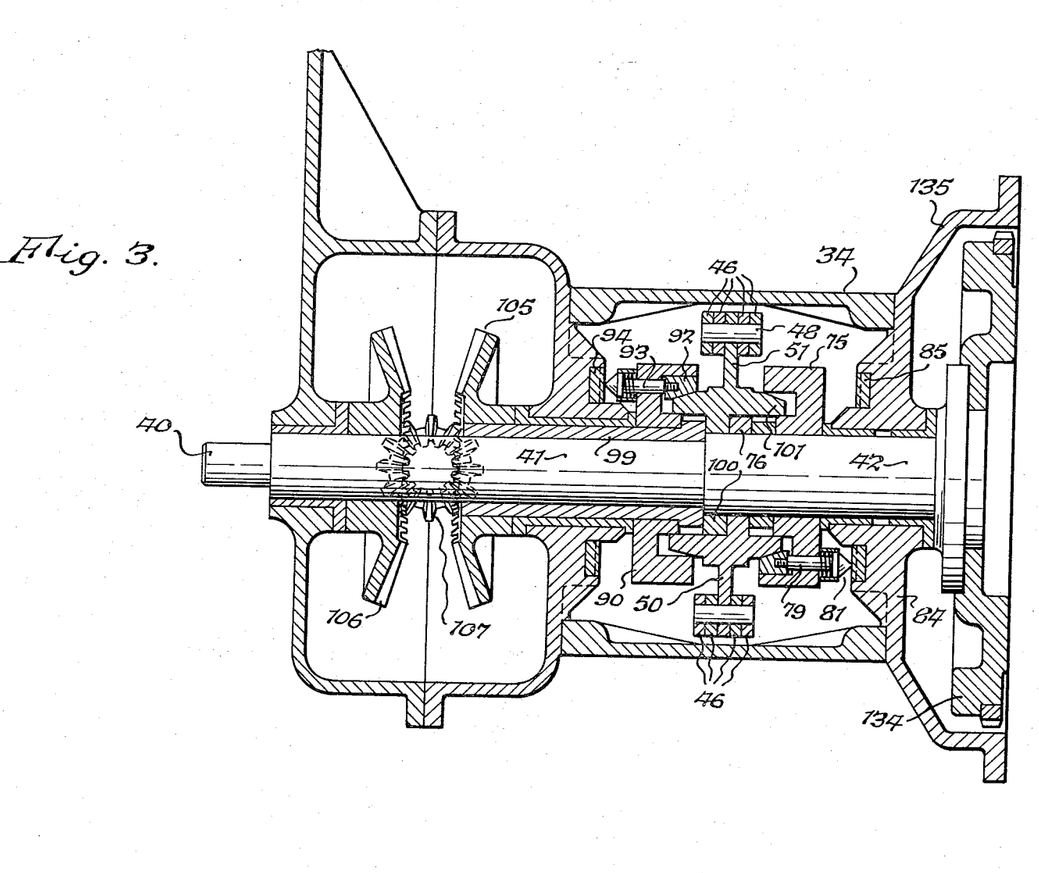
FIG. 3 is a sectional elevation thereof on line 3—3, FIG. 1.
Figures 4, 5:
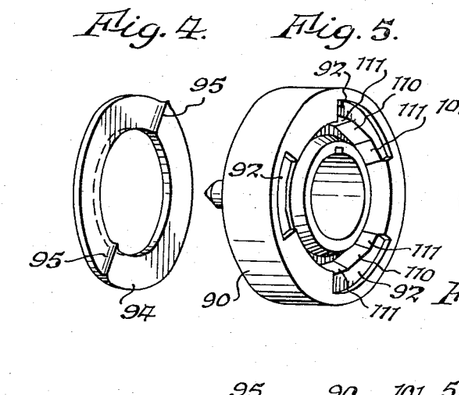
FIG. 4 is a perspective view of a stationary cam having parts thereon for moving a clutch member of a fly wheel into clutching position.
FIG. 5 is a perspective view of one of the fly wheels.

The fly wheel 90 is keyed to a hollow shaft or sleeve 99 rotatable about the part 41 of the drive shaft of the engine and the rotation imparted to the sleeve 99 is of course in the reverse direction from that imparted to the fly wheel 75. Since all power must be transmitted to the drive shaft 40 in one direction, the following mechanism is employed for transmitting power from the hollow shaft or sleeve 99 in the same direction of rotation as the drive shaft 40. For this purpose the sleeve 99 is provided with a bevel gear 105 rigidly secured thereto and the part 41 of the drive shaft 40 is provided with another bevel gear 106 also keyed thereto, as shown in FIG. 3. These two bevel gears are connected by means of bevel pinions 107 for the purpose of transmitting rotation of the sleeve 99 through the bevel gear 105, bevel pinion 107 and bevel gear 106 to the drive shaft of the engine. It will thus be noted that continuous rotation is applied to the engine shaft by means of the pistons in spite of the fact that these pistons result in rotation of their drive arm simultaneously in opposite directions. The connection between the two shafts also ensures correct relations between the fly wheels 75 and 90.

It is important of course that the clutch or grip members of the drive arms and those mounted on the fly wheels produce an accurate connection between the fly wheels and the drive arms at the desired intervals of rotation, such as 60 degrees. For this purpose the extensions of the drive arms, such as the extensions 77, 91 and 101, are formed to fit accurately into the clutch or grip members within the recesses of the fly wheels. For this purpose the friction members or blocks 92 of the fly wheels each have intermediate of their ends a flat portion 110 extending tangentially to the axis of rotation of the fly wheels, and at opposite sides of the flat portions 110 there are provided portions 111 inclined at slight angles to the flat, tangential portions 110. The extensions 77 of the drive arms are provided in the middle portion with flat portions 112 terminating in inclined portions 113. When the friction blocks 92 are moved into contact with the extensions of the drive arms, the inclined surfaces 111 and 113 cooperate to position the flat portions 110 and 112 in correct gripping relation to each other. The inclined portions 111 and 113 also act to a certain extent as stops to prevent the drive arms from moving out of their correct relations to the fly wheels. Any other means for providing correct gripping relations between the drive arms and the fly wheels may be provided.

It will of course be obvious that when the gripping or clutch members are moved into engagement by the raised cam parts 85 or 95, they will remain in engagement during the power stroke of the drive arm 50 or 51. When a drive arm reaches the end of its power stroke, the gripping connection between the drive arm and the fly wheel will be broken.

Power may be taken from the engine from the end of the shaft 40 which projects out of the engine at the top of FIG. 1. I have also provided at the opposite end of the shaft a main fly wheel 134 (FIG. 1), arranged within an extension or base 135 of the engine frame. Power may also be taken from a shaft 136 on which the head pinions 107 may be secured.

Figures 6, 7, 8, 9, 11, 12:
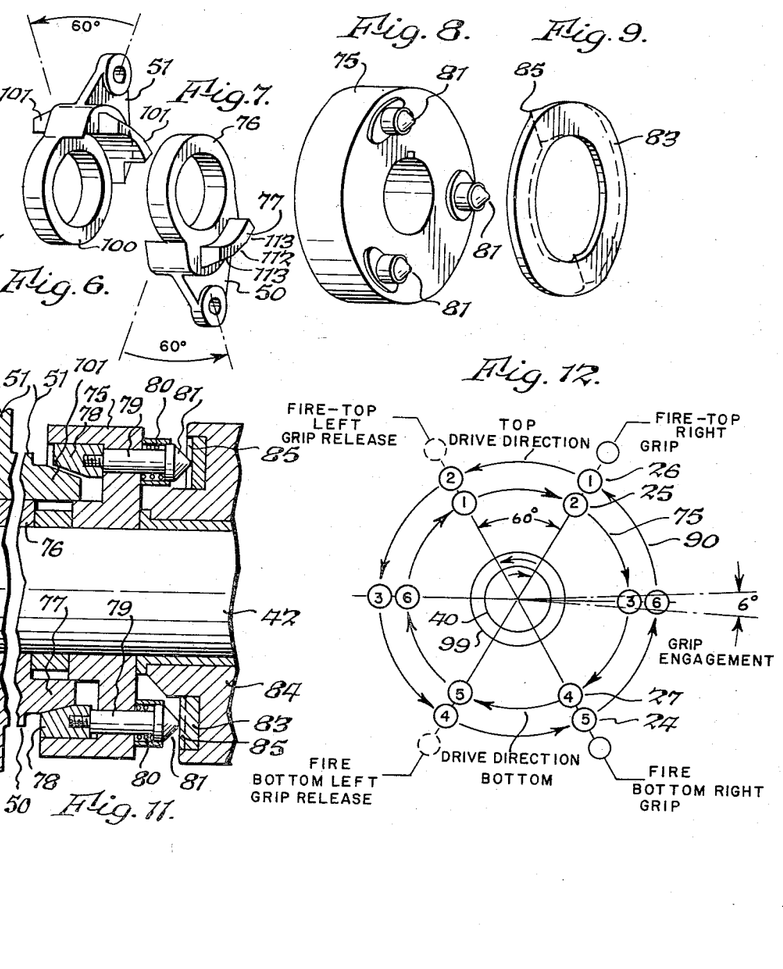
Figure 10:
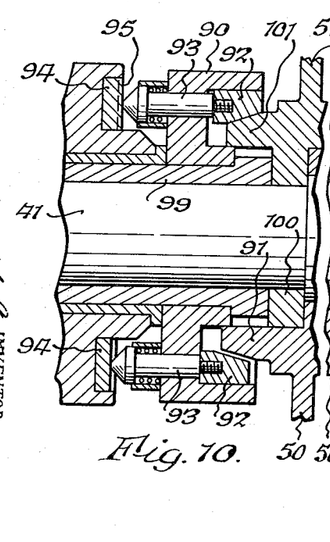
FIG. 10 is a longitudinal, sectional view showing the devices illustrated in FIGS. 4–6 inclusive in operative relation to each other.

I have illustrated diagrammatically in FIG. 12 the manner of operation of the engine shown in FIGS. 1–11. The diagram includes the two inner circles, the inner of which represents the shaft 40 and the outer of which represents the hollow shaft or sleeve 99. The other circles represent the direction of movement of the fly wheels, the inner or smaller circle representing the fly wheel 75 and the larger circle representing the fly wheel 90. The upper part of the diagram refers particularly to the upper part of FIG. 2 of the drawings. Both of these outer circles are divided into 60 degree segments. During a working stroke of the piston 26 during which this piston through its drive arm moves the fly wheel 90 through a 60 degree angle, this travel of the piston 26 turns its fly wheel from the position 1 to position 2, the position numerals being indicated in small circles. During this time the other piston 25 is moved through its compression stroke, and its upper power stroke begins at position 1 in the smaller circle, thus moving the fly wheel 75 from position 1 to position 2. This cycle is then repeated through the entire circle, simultaneously turning the shaft 40 and the hollow shaft or sleeve 99 in opposite directions. Similarly as shown in the lower half of FIG. 2, as the piston 27 moves through its power stroke, it turns its fly wheel from position 3 to position 4 and at the same time the other piston 24 is moved through its compression stroke, and at position 5 this piston will turn the hollow shaft 99 from position 5 to position 6. The actions of the pistons and fly wheels are then repeated as indicated on the diagram.

There is also indicated in FIG. 12 an angle of 6 degrees which is the maximum length of time allowed for disengagement and engagement of the gripping means, since it will be obvious of course that the gripping of one drive arm with its fly wheel would normally take place within two degrees of rotation and the 6 degree angle represents approximately the limit of time allowed for movement of the driving means of the drive arms and fly wheels into or out of driving engagement.

Figure 13:
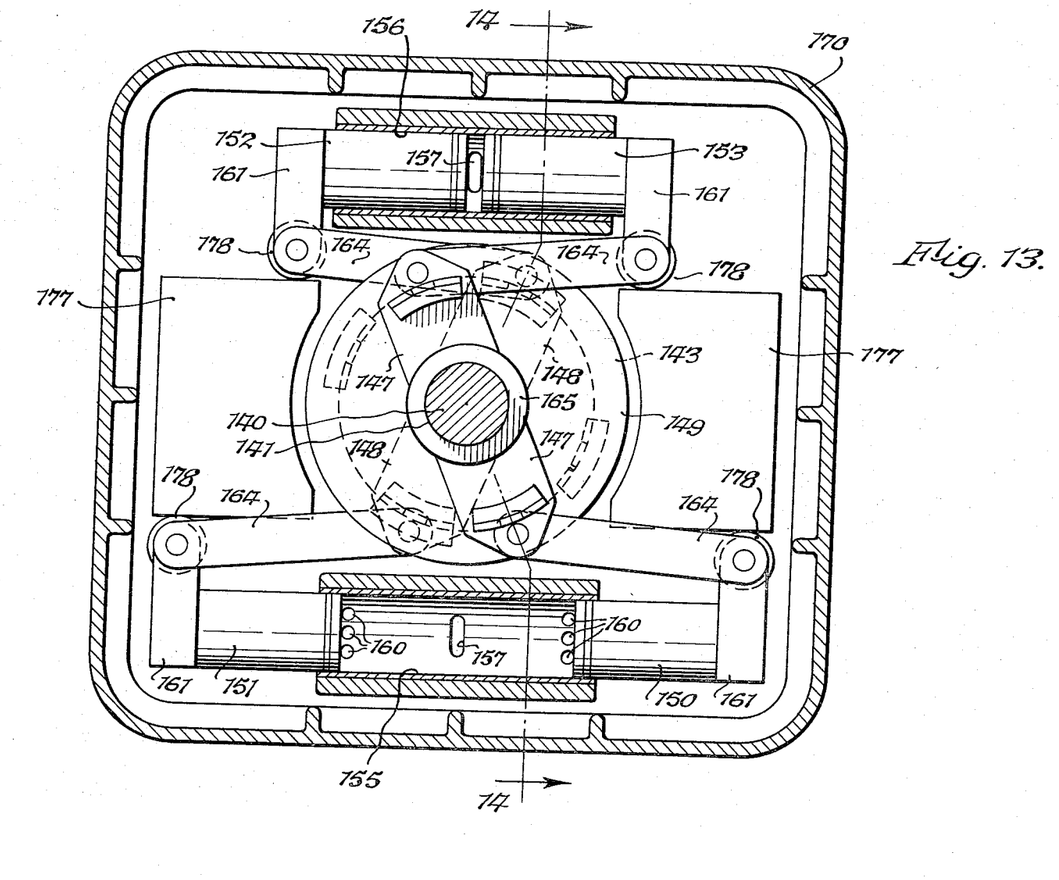
FIG. 13 is a transverse, sectional view of an engine of modified construction.
Figure 14:
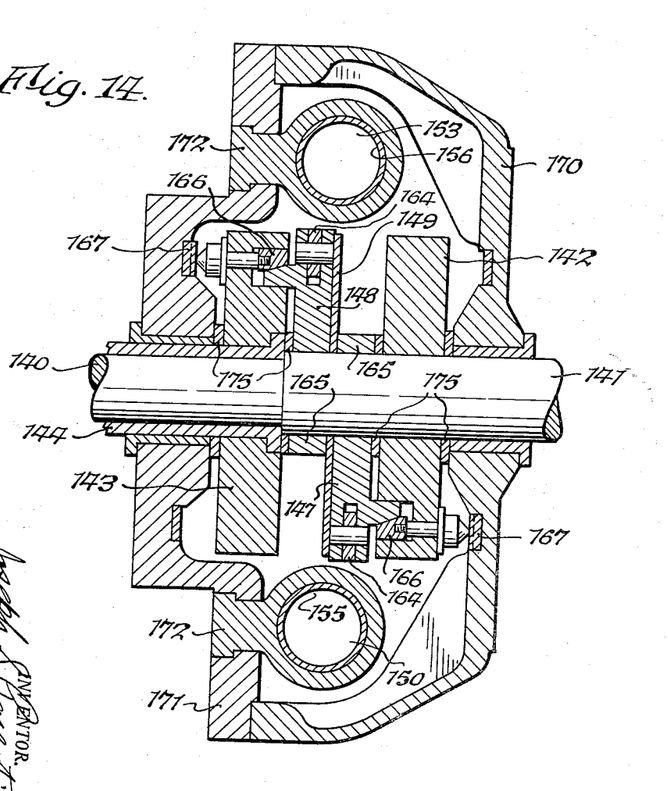
FIG. 14 is a longitudinal, sectional view thereof on line 14—14, FIG. 13.
Figure 15:
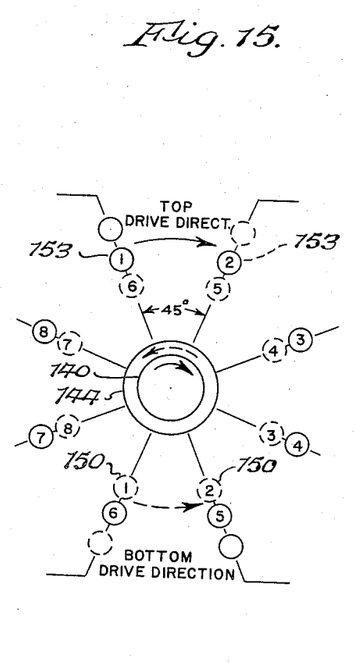
FIG. 15 is a diagrammatic view showing the manner of operating the engine shown in FIGS. 13 and 14.

In the modified construction shown in FIGS. 13–15, the engine shaft 140 has an integral portion 141 of larger diameter. A fly wheel 142 is rigidly secured on the enlarged portion 141 of the shaft and another fly wheel 143 is secured to a sleeve or hollow drive shaft 144 rotatable about the shaft 140. The two fly wheels are rotated in opposite directions in the same manner as described in connection with the preceding figures but through angles of 45 degrees. The shaft 140 and sleeve 144 are secured to suitable means for reversing the direction of the sleeve 144 to add its torque to that of the shaft 140. This may be accomplished, for example, by means of bevel gears as in the construction clearly shown in FIGS. 1 and 3 of the drawings.

The fly wheels 142 and 143 may be identical in construction with those described in connection with the preceding figures, and motion is imparted to the fly wheels by means of drive arms 147 and 148 separated by a disk 149 to which oscillatory motion is imparted by means of two sets of pistons, as in the preceding construction. The drive arm 147 imparts increments of rotary motion from piston 150 only to the fly wheel 142 and the drive arm 148 imparts motion from the piston 151 to the fly wheel 143.

One set or pair of pistons comprises the pistons 150 and 151 and the pistons 152 and 153 constitute the other set. The pistons 150 and 151 are reciprocable in the same cylinder 155 and move in opposite directions toward each other. Similarly the pistons 152 and 153 reciprocate in a cylinder 156. Each of these cylinders has a port 157 through which air may be admitted by suitable mechanism to discharge the burnt gases in the cylinders through exhaust ports 160. Fuel may be admitted to the two sets of cylinders in any suitable manner as has been heretofore common practice, and the fuel admission means are consequently not herein shown.

Each of these pistons has rigidly secured thereon an arm 161 extending laterally from the outer end if the piston. These arms have pivotally connected thereto rods 164 which correspond to the piston rods 46 in the construction shown in FIGS. 1–11. The rods 164 of the pistons 150 and 153 are connected to the opposite ends of the drive arm 147. These drive arms each have two outwardly extending projections extending in diametrically opposite directions from the circular bearing portions 165 of the drive arms. The piston 150 is connected to one projection of the drive arm 147 while the piston 153 is connected to the other projection thereof. Consequently, while the piston 153 moves through a power stroke it will turn the drive arm 147 in a clockwise direction and the piston 150 will be moved to the left in FIG. 13 through its compression stroke.

Similarly the pistons 152 and 151 are connected by the drive arm 148. In this construction each stroke of a piston moves its fly wheel through 45 degrees. Each drive arm is coupled to its fly wheel by means of clutch or gripping means 166 actuated by a fixed cam 167, as described in connection with FIGS. 1–11. Each drive arm however cooperates with one fly wheel only and turns the same through an angle of 45 degrees during each power stroke of its piston. During the power strokes of the pistons of any pair, the pistons of the other pair will of course be moved through their compression strokes.

This mechanism is mounted in a housing comprising two parts 170 and 171 suitably secured together in which the shaft 140 is journalled. The housing part 171 is provided with suitable means for supporting the cylinders, such for example as arms 172 securely mounted in this housing part 171. The fly wheels and drive arms are preferably separated from each other by suitable disks or spacing washers 175.

The housing is also provided with stationary guide members 177 and the arms 166 may be provided with rollers 178 which travel along edges of the guides 177 so as to ensure that the pistons will travel coaxially with their cylinders.

The operation of the engine as shown in FIGS. 13 and 14 is illustrated in the diagram of FIG. 15. 140 represents the drive shaft while 144 represents the outer drive sleeve, the arrows indicating their direction of rotation. As noted before, the complete cycle is divided into 45 degree segments representing the individual strokes each piston will travel through.

The diagram FIG. 15 can be applied as being an identical position of the parts as shown in FIG. 13 except for the fact that FIG. 15 will deal with only the right hand side of FIG. 13, i.e. the pistons 153 and 150 and their related parts. Since the left hand side would be identical but reversed in direction, only one side is represented for clarity.

Encircled numerals 1–8 in solid lines and progressing clockwise from left to right represent power strokes of the piston 153 while the inner numerals encircled in dotted lines progressing counterclockwise from right to left represent power strokes of the piston 150.

As can be observed, position 1 is the firing position of the piston 153 which will move 45 degrees in the direction of the arrow to the right to position 2, driving the fly wheel 143 in this direction by means of its engaged clutch member. Since crank arm 147 also projects the other side of shaft 140 the lower piston 150 and its parts will move to the clockwise to left at the bottom to position 1 in broken lines. This is the firing position of piston 150 and when it fires it will move the fly wheel 142 counterclockwise in the direction of the broken arrow through its engaged clutch member.

Each power stroke of each piston serves to put its opposite piston into compression position ready for firing while also driving its related fly wheel in the proper direction.

The full line positions from 1–8 will then progress clockwise around the diagram of FIG. 15 as well as the broken line positions from 1–8 in counterclockwise movement, each being in step with one another to complete a full revolution of both the shaft 140 and sleeve 144.

From the above it will be obvious that the action of the four pistons will be repeated in such a manner that when one pair of pistons imparts rotation to the shaft 140 the other pistons at the same time turn the hollow shaft 144 in the opposite direction. It will also be clear from the drawings that power is continually transmitted to the shaft 140 directly from the fly wheel 142 and the other fly wheel 143 transmits power to the hollow shaft 144. Consequently through the bevel gears or the like shown in FIGS. 1 and 2, the shaft 140 and hollow shaft 144 are continuously connected so that torque is also continuously transmitted to the shaft 140.

Figure 16:
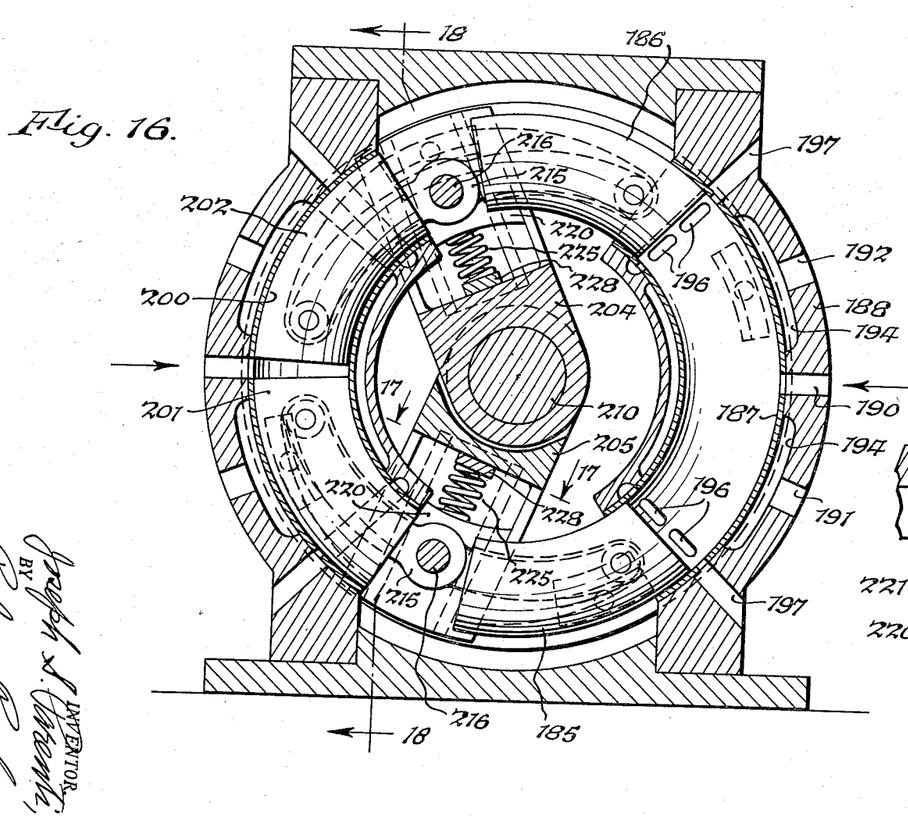
FIG. 16 is a transverse sectional view of an engine of another modified construction.
Figure 17:
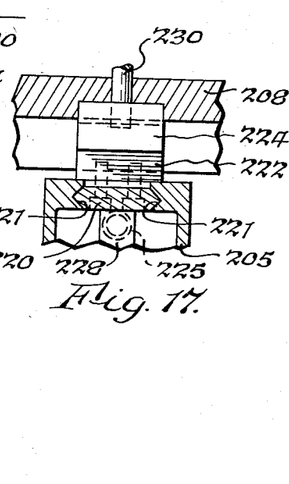
FIG. 17 is a fragmentary, sectional view thereof on line 17—17, FIG. 16.
Figure 18:
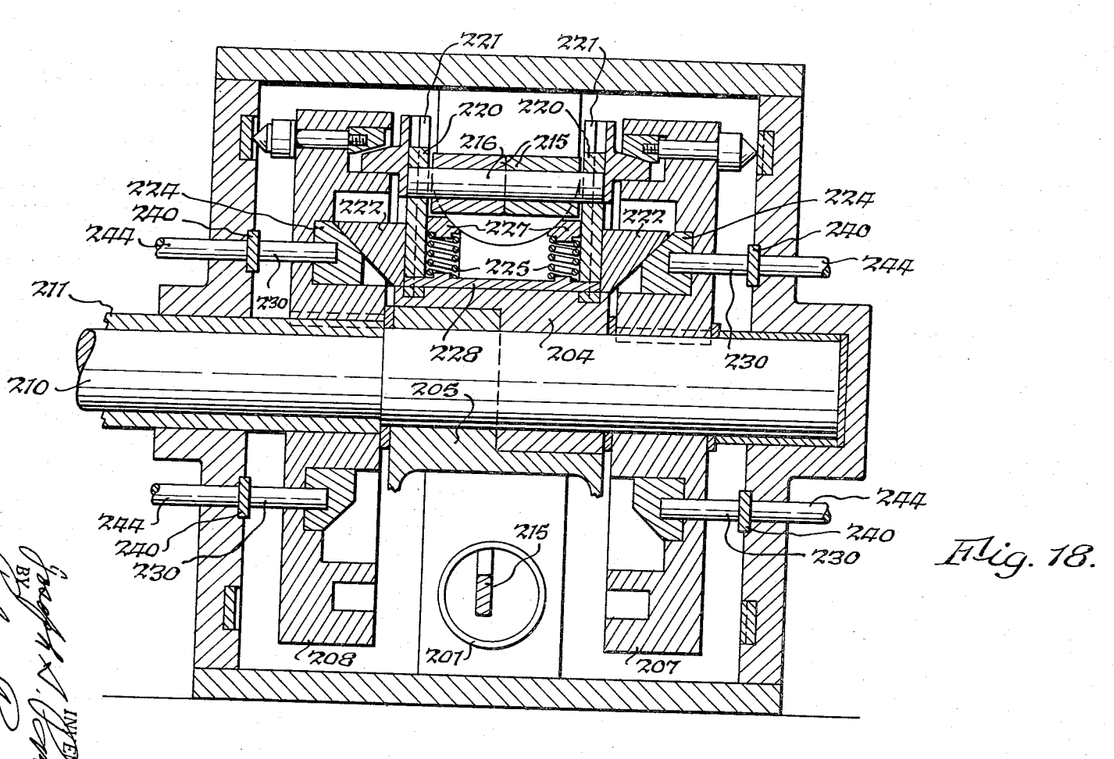
FIG. 18 is a longitudinal, sectional elevation thereof on line 18—18, FIG. 16.

In FIGS. 16 to 18 I have illustrated another modification of my engine in which the cylinders and pistons are of segmental form, the two pistons 185 and 186 reciprocating in a cylinder 187 somewhat in the same manner as the pistons 150 and 151 cooperate with a single cylinder 155 in FIGS. 13 and 19. The cylinder 187 is supported within a housing member 188 which is provided intermediate of the ends of the cylinder 187 with an inlet 190 for compressed air. The cylinder is spaced from the housing 188 sufficiently to form passages for coolant which passes into and out of the housing through passages 191 and 192 and through a space 194. The cylinder is also provided with exhaust openings 196 near the opposite ends thereof from which exhaust passes through the openings 197 in the housing. At the other side of the engine a similar cylinder 200 is provided with which pistons 201 and 202 cooperate.

There is also provided in the engine of this modification a pair of drive arms 204 and 205 mounted to turn about the engine shaft 210 which also has a hollow shaft or sleeve 211 mounted thereon.

The operation of the engine will be readily understood since the drive arms 204 and 205 have clutch parts cooperating with clutch parts on the two fly wheels 207 and 208 in the same manner as described in connection with the engines shown in FIGS. 1–15, the fly wheel 207 being secured on the drive shaft 210 and the fly wheel 208 being keyed to the hollow shaft 211. These two shafts are connected to bevel gears or other means for reversing the direction of rotation of the hollow shaft 211 to that of shaft 210. It will be understood of course that each piston is connected with its drive arm by means of piston rods 215 connected by pins 216 with the drive arms.

This engine is provided with an additional feature not found in the preceding figures, namely for providing a choice of adjustment to get maximum efficiency of the engine for certain conditions. This is accomplished by moving the connecting pin 216 between the drive arms and the connecting rods 215 inwardly and outwardly from the axis of the shaft 210. Obviously when these connecting pins are in outer positions, they will exert greater leverage on the fly wheels and thus enable them to increase the power which the engine is capable of delivering. For this purpose the drive arms 204 and 205 are provided with slide members 220 on which the shafts or pins 216 are journalled and which are guided for radial movement on the drive arms, for example, by means of slideways 221. The change in position of the connecting pins also varies the compression in the cylinders.

The slide members may be moved radially in any suitable manner while in rotation, and this may be accomplished for example by means of cooperating bevel members 222 secured to the slide members 220 and having inclined faces formed to cooperate with corresponding inclined faces on the cooperating bevel members 224, and it will consequently be evident that if the bevel members 224 are pushed inwardly from the positions shown in FIG. 18 they will force the slide members 222 and the shafts 216 outwardly against the action of springs 225. One end of each spring is seated on a projection 227 of the drive arms and the other end of this spring on a cross member 228 connecting the two slide members 220. Consequently when the bevel members 224 on both of the fly wheels are moved inwardly toward each other, the slide members 220 will be moved outwardly against the action of the springs 225. These springs on the other hand, will move the slide members and the shaft 216 carried thereby to their innermost positions.

Any suitable means may be provided for moving the bevel members 222 radially while the engine is in operation. In the construction shown for this purpose I have provided each of the bevel members 224 with a pin 230 extending through a hole in the fly wheel. The outer ends of these pins terminate at rub rings 240. These rub rings 240 are mounted on the inner ends of pins 244 which extend out through holes in the sides 241 of the housing. The outer ends of these pins may be connected to any suitable adjusting members, not shown, whereby all of the pins may be simultaneously pushed inwardly to move the rub rings 240 against the pins 230 of the bevel members 224. The inward movement of these pins 230 and 244 will result in moving the bevel members 224 toward the center of the engine, thus moving the other bevel members 222 and the slide members 220 connected therewith radially outwardly. Upon release of pressure on the pins 244, the springs 225 will urge the slide members inwardly toward the axis of the shaft 240.

It will be understood that various changes in the details, materials and arrangements of parts which have been herein described and illustrated in order to explain the nature of the invention may be made by those skilled in the art within the principle and scope of the invention as expressed in the appended claims.

I claim:

1. An engine operating on vapor pressure and having a plurality of pairs of opposed pistons, (a) cylinders in which said pistons operate the pistons of each pair connected for simultaneous movement with each piston moving through a power stroke while the other piston moves through a compression stroke, (b) piston rods each having one end pivotally connected with a piston, (c) drive arms connected with said piston rods for oscillation thereby, (d) rotary members intermittently connected during fractions of their rotations with said drive arms, (e) grip means on said arms and said rotary members which form driving connections between said rotary members and said arms during fractions of each revolution of said rotary members, (f) stationary cam means positioned to place said grip means into locking engagement during the power strokes only of the pistons, said cam means having parts which disengage said grip means when the power stroke of a piston is completed, (g) and means actuated by each piston of a pair during its power stroke to move the other pistons of its pair through its compression stroke.

2. An engine according to claim 1 in which said rotary members are driven in opposite directions by said pistons, (a) a pair of shafts driven in opposite direction by said rotary members, (b) and means for reversing the direction of rotation of one of said shafts, and a connection between said shafts for imparting the power of said one shaft to the other shaft.

3. An engine having a plurality of cooperating cylinders and pistons, said pistons being arranged in pairs and movable simultaneously in opposite directions through their power and compressing strokes, (a) an oscillatory drive arm for each pair of pistons and to which said pistons are connected to move said drive arm in opposite directions during their power strokes, (b) fly wheels rotated in opposite directions through partial revolutions by said drive arms during the power strokes of said pistons, (c) cooperating pairs of wedge members on said arm and said fly wheels, one of said wedge members of each pair being movable into and out of engagement with the other wedge member of the pair, (d) a stationary cam for each pair of wedge members having surfaces for moving a movable wedge member into and out of engagement with said other wedge member, (e) and a slidable rod on each fly wheel and secured to the movable wedge member and extending into a position to engage said stationary cam surface.

4. An engine having a plurality of cooperating cylinders and pistons, said pistons being connected with each other and arranged in pairs with one piston moving through a power stroke while the other piston moves through a compressing stroke, (a) an oscillatory drive arm for each pair of pistons and to which said pistons are connected to move said drive arm in opposite directions during their power strokes, (b) fly wheels rotated in opposite directions through partial revolutions by said drive arm during the power strokes of said pistons, (c) gripping means connecting said drive arms with said fly wheels during the power strokes of said pistons, (d) said gripping means including pairs of cooperating gripping members, one of each pair mounted on a fly wheel and the other of which is mounted on a drive arm, (e) and stationary cam means operating at the beginning of each power stroke to move said gripping members into locking engagement, said cam means terminating to release said gripping members at the end of the power stroke.

5. An engine according to claim 4 in which said means for moving said gripping members into locking engagement comprises a part connected with one of said gripping members and extending toward said cam means and cooperating with said cam for moving said gripping members into gripping engagement at the beginning of a power stroke, said cam means terminating to release said gripping members at the end of the power stroke.

6. An engine having a plurality of cooperating cylinders and pistons, said pistons being connected with each other and arranged in pairs with one piston moving through a power stroke while the other piston moves through an intake stroke, (a) an oscillatory drive arm for each pair of pistons, and to which said pistons are connected to move said drive arm in opposite directions during their power strokes, (b) fly wheels rotated in opposite directions through partial revolutions by said drive arm during the power strokes of said pistons, (c) gripping means connecting said drive arms with said fly wheels during the power strokes of said pistons, (d) said gripping means including pairs of cooperating gripping members, one of each pair mounted on a fly wheel and the other of which is mounted on a drive arm, (e) said gripping members being of wedge shape and the wedge-shaped member on the fly wheel being movable into and out of engagement with the wedge-shaped member on a drive arm, (f) means for yieldingly holding the wedge-shaped members on said fly wheels out of engagement with said wedge-shaped parts of said drive arms, (g) and stationary cam controlled means for moving the wedge-shaped members of said fly wheels into gripping engagement with said drive arms.

7. An engine having a plurality of cooperating cylinders and pistons, said pistons being arranged in pairs and movable simultaneously in opposite directions, (a) a pair of fly wheels rotatable about a common axis, (b) a pair of drive arms to which two pistons of a pair are connected, (c) said fly wheels facing each other and having a pair of drive arms arranged between them, (d) a pair of pistons connected with one of said drive arms and another pair of pistons connected with the other drive arm, (e) both of said drive arms having wedge-shaped members extending into operative relation to both of said fly wheels, (f) stationary cams cooperating with said fly wheels to move said wedge-shaped members into and out of engagement for connecting and disconnecting said drive arms and said fly wheels, (g) one piston of each pair turning its drive arm in one direction for engagement with one of said fly wheels and the other piston of a pair turning said drive arm in the opposite direction for engagement with the other fly wheel.

8. An engine comprising two pairs of cylinders with pistons mounted to reciprocate therein, (a) a cylinder of each pair communicating with a combustion chamber having a single head, (b) said cylinders having discharge openings therein for exhaust gases which are uncovered by pistons upon completion of their power strokes, (c) means for forcing air into said compression chamber for passage through both cylinders when said pistons are at the ends of their power strokes to purge burnt gases therefrom, (d) drive arms oscillatable about a common axis and to which the pistons of each pair are connected,
(e) each piston of a pair through its power stroke moving the other piston of its pair through its compression stroke,
(f) and means for transmitting the power from said drive arms to a common shaft.

9. An engine having a plurality of pairs of reciprocatory pistons,
   (a) a cylinder for each pair of pistons into which the pistons enter in opposite directions during the compression stroke of the engine and out of which they move during the power stroke of the pistons,
   (b) arms on said pistons extending laterally therefrom,
   (c) rods connected with said arms,
   (d) fly wheels rotatable about fixed axes,
   (e) drive arms oscillatory about the same axis and to which the piston rods are connected for oscillating said drive arms through parts of a revolution,
   (f) and grippings means connecting said drive arms with said fly wheels during the power stroke of a piston connected therewith,
   (g) said cylinders having exhaust openings uncovered by said pistons when in their outer positions in said cylinders,
   (h) and said cylinders having openings in the middle portions thereof for receiving air to purge gases from said cylinders.

10. An engine according to claim 9 in which said drive arms each has two radially extending projections movable in opposite directions by said pistons through said piston rods,
    (a) each piston of a pair during its power stroke returning its drive arm in a direction to move the other piston of the pair through a compression stroke.

11. An engine according to claim 8 in which said cylinders and pistons are of arc shape.

12. An engine having cylinders of arc shape and each provided with a pair of pistons movable through opposite ends of said cylinders,
    (a) a shaft positioned between said arc-shaped cylinders,
    (b) drive arms mounted to oscillate about said shaft,
    (c) piston rods connecting said pistons with said drive arms for imparting oscillatory motion to said drive arms,
    (d) means for transmitting power from said drive arms to said shaft,
    (e) each of said drive arms including an extension movable radially on said arms and to which said piston rods are pivotally connected,
    (f) and means for moving said pivotal connections of said piston rods with said extensions radially to vary the distance of said connections from the axis of said engine.

13. An engine according to claim 12 and including means for simultaneously adjusting the extensions of said drive arms relatively to the drive shaft.

14. An engine according to claim 13 and including means extending to the exterior of said engine and movable to position said extensions relatively to said drive arms.

15. An engine according to claim 14 and including fly wheels with which said drive arms cooperate to impart rotation to the engine,
    (a) cooperating wedge members on said fly wheels and on said extensions of said drive arms,
    (b) said wedge members on said fly wheels being movable relatively to said fly wheels in a direction parallel to the axis of the engine and having inclined faces which cooperate with inclined faces on said extensions for moving said extensions outwardly.

16. An engine according to claim 15 and including springs mounted to urge said extensions in a direction toward the axis of the engine to urge said extensions inwardly when said movable wedge members are withdrawn from the positions in which they force the extensions outwardly.

17. An engine according to claim 3 and including cooperating faces on said wedge members which guide the wedge members of each pair into correct relation to each other.

References Cited by the Examiner

UNITED STATES PATENTS

| | | | |
|---|---|---|---|
| 1,304,129 | 5/1919 | Walk | 123—197 |
| 2,157,764 | 5/1939 | Langrognet | 123—18 |
| 3,080,856 | 3/1963 | Berry | 123—18 |

FOREIGN PATENTS

| | | |
|---|---|---|
| 148,697 | 8/1920 | Great Britain. |
| 101,414 | 5/1962 | Netherlands. |

MARK NEWMAN, *Primary Examiner.*

WENDELL E. BURNS, *Examiner.*